(12) United States Patent
Smith et al.

(10) Patent No.: US 7,290,812 B2
(45) Date of Patent: Nov. 6, 2007

(54) VEHICLE IMPACT ENERGY MANAGEMENT SYSTEM

(75) Inventors: Bradley W. Smith, Ogden, UT (US); David W. Parkinson, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 80 days.

(21) Appl. No.: 11/132,804

(22) Filed: May 19, 2005

(65) Prior Publication Data

US 2006/0261638 A1 Nov. 23, 2006

(51) Int. Cl.
*B60R 19/21* (2006.01)
(52) U.S. Cl. .................... 293/135; 296/187.09
(58) Field of Classification Search ........... 293/118, 293/119, 110, 135, 136, 137; 296/187.09
See application file for complete search history.

(56) References Cited

U.S. PATENT DOCUMENTS

| | | | |
|---|---|---|---|
| 5,884,959 A * | 3/1999 | Hillen | ............... 293/134 |
| 5,967,573 A | 10/1999 | Wang | |
| 6,050,624 A | 4/2000 | Kim | |
| 6,056,336 A | 5/2000 | Balgobin | |
| 6,106,038 A | 8/2000 | Dreher | |
| 6,135,251 A * | 10/2000 | Hartlieb et al. | ............. 188/371 |
| 6,174,008 B1 | 1/2001 | Kramer et al. | |
| 6,179,356 B1 * | 1/2001 | Hartlieb et al. | ............. 293/133 |
| 6,189,941 B1 | 2/2001 | Nohr | |
| 6,227,583 B1 * | 5/2001 | Eipper et al. | ............... 293/133 |
| 6,401,565 B1 | 6/2002 | Wang et al. | |
| 6,454,326 B2 | 9/2002 | Demarquilly et al. | |
| 6,554,333 B2 | 4/2003 | Shimotsu et al. | |
| 6,648,384 B2 | 11/2003 | Nees et al. | |
| 6,834,899 B2 | 12/2004 | Lindsey | |

* cited by examiner

*Primary Examiner*—Lori L. Lyjak
(74) *Attorney, Agent, or Firm*—Sally J. Brown; Paulen Petersen & Erickson

(57) ABSTRACT

An impact energy management system for absorbing or displacing kinetic energy during a collision. The system includes a housing defining a chamber and a contact element disposed at least partially within the chamber and longitudinally movable therein. At least a first load bearing pin is disposed between the energy adsorbing member and the housing. Prior to the collision, the contact element is disposed in an impact position, and upon the collision, the contact element moves within the chamber and the first pin deforms a segment of at least one of the housing or contact element, thereby reducing the force of the impact by transferring energy into the deformation.

20 Claims, 13 Drawing Sheets

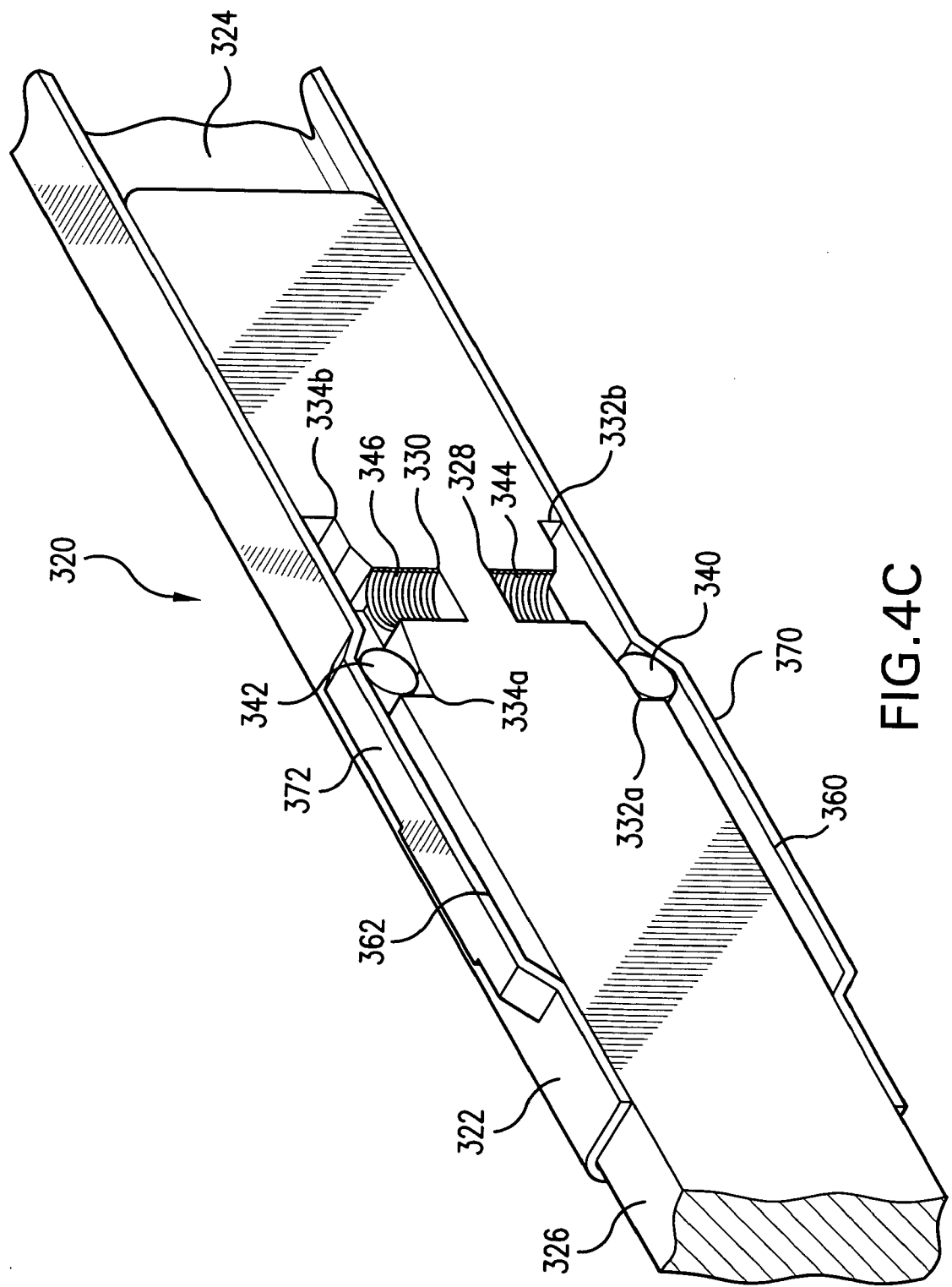

VEHICLE IMPACT ENERGY MANAGEMENT SYSTEM

BACKGROUND OF THE INVENTION

This invention relates generally to a collision energy absorbing system and, more particularly, to an impact energy management system for absorbing or displacing the kinetic energy of a motor vehicle collision.

Motor vehicles are a part of everyday life for most individuals around the world. For example, most people use some type of motor vehicle to transport themselves to and from work, to run errands, to attend recreational events, to visit family members and friends, and so forth. Some people use motor vehicles because they provide more convenient transportation than available alternatives. Others use motor vehicles because they find the experience of driving to be enjoyable. Whatever the reasons behind their popularity, the demand for motor vehicles is unlikely to abate anytime in the near future.

Researchers are constantly trying to find ways to improve various aspects of motor vehicles. One significant area of research relates to motor vehicle safety. Unfortunately, motor vehicle collisions cause a large number of injuries and deaths in the United States. Consequently, efforts are constantly being made to increase the safety of motor vehicles, particularly in a collision situation.

One device which is often used to provide increased safety to the occupants of a motor vehicle during a collision is a bumper assembly. A bumper assembly absorbs at least some of the impact or kinetic energy of a collision involving the motor vehicle. Conventional bumper assemblies typically include a stationary bumper that can deform permanently or resiliently during a collision, thereby preventing or reducing the amount of damage to the vehicle frame, adjacent components, and vehicle occupants.

While conventional bumper assemblies typically provide a level of crash protection, there is a need for an improved collision energy absorbing system to provide additional collision protection for motor vehicles and occupants thereof. There is a need for an efficient, effective and low-cost collision energy absorbing system for absorbing or displacing impact forces of a motor vehicle collision.

SUMMARY OF THE INVENTION

A general object of the invention is to provide an improved collision energy absorbing system for motor vehicles.

A more specific objective of the invention is to overcome one or more of the problems described above.

The general object of the invention can be attained, at least in part, through an impact energy management system for absorbing or displacing kinetic energy during a collision. The system includes a housing defining a chamber and a contact element disposed at least partially within the chamber and longitudinally movable therein. At least a first load bearing pin is disposed between the energy adsorbing member and the housing. Prior to the collision, the contact element is disposed in an impact position, and upon the collision, the contact element moves within the chamber and the first pin deforms a segment of at least one of the housing and the contact member.

Compared to the system of the invention, the prior art generally fails to disclose a simple and efficient system for absorbing a portion of the impact of a vehicle collision.

The invention further comprehends another impact energy management system for absorbing or displacing kinetic energy during a collision. The system includes an elongated housing defining a chamber and a contact element disposed at least partially within the chamber and longitudinally movable therein. At least one of the housing and the contact element includes a recess. The system includes an actuating device for moving the contact element from an inactive position within the chamber to an impact position within the chamber upon or prior to the collision. A load bearing pin is disposed within the recess of one of the housing and the contact element in the inactive position, and the pin is partially disposed in the recess in the impact position. During the collision, the contact element moves from the impact position toward the inactive position, whereby the pin deforms a segment of at least one of the housing and the contact element.

The invention still further comprehends yet another impact energy management system for absorbing or displacing kinetic energy during a collision. The system includes an elongated housing defining a chamber and a contact element disposed at least partially within the chamber and longitudinally movable therein. The system also includes an actuating device for moving the contact element from an inactive position within the chamber to an impact position within the chamber upon or prior to the collision. A first contact element recess is disposed in the contact element and a second contact element recess is disposed in the contact element on an opposite side of the first contact element recess. A first housing recess is disposed in the housing and a second housing recess is also disposed in the housing on an opposite side of the first housing recess. A first load bearing pin is disposed in the inactive position in one of the first contact element recess and the first housing recess and a second load bearing pin is disposed in the inactive position in one of the second contact element recess and the second housing recess. In the impact position, at least the first pin is partially disposed in each of the first contact element recess and the first housing recess. During the collision the contact element moves from the impact position toward the inactive position, whereby at least the first pin deforms a segment of at least one of the housing and the contact element.

Other objects and advantages will be apparent to those skilled in the art from the following detailed description taken in conjunction with the appended claims and drawings.

BRIEF DESCRIPTION OF THE DRAWINGS

FIGS. 4A-C are partial, sectional views of a general representation of an impact energy management system for absorbing or displacing kinetic energy during a collision, according to still yet another embodiment of this invention.

DETAILED DESCRIPTION OF THE INVENTION

The present invention provides an impact energy management system for absorbing a portion of impact forces during a motor vehicle collision. The impact energy management system uses one or more load bearing pins to deform, for example, a system housing, thereby reducing the force of the impact by transferring energy into the housing deformation. The impact energy management system can be incorporated anywhere in a vehicle where absorption of collision energy is needed or desired, such as, for example, in bumpers, seats and/or the hood of the vehicle. The system of the invention beneficially can provide additional time during a collision for a collision sensor system to analyze the collision and make the appropriate response. The additional time can also desirably provide vehicle safety restraint systems more flexibility in their ability to protect vehicle occupants from injury or death. The system of the invention can also reduce vehicle damage and costly repairs, particularly vehicle body work typically caused by low-speed collisions. The impact energy management system of the invention is relatively simple and inexpensive to produce and install, and easily concealed in various applications.

Figure 1A:
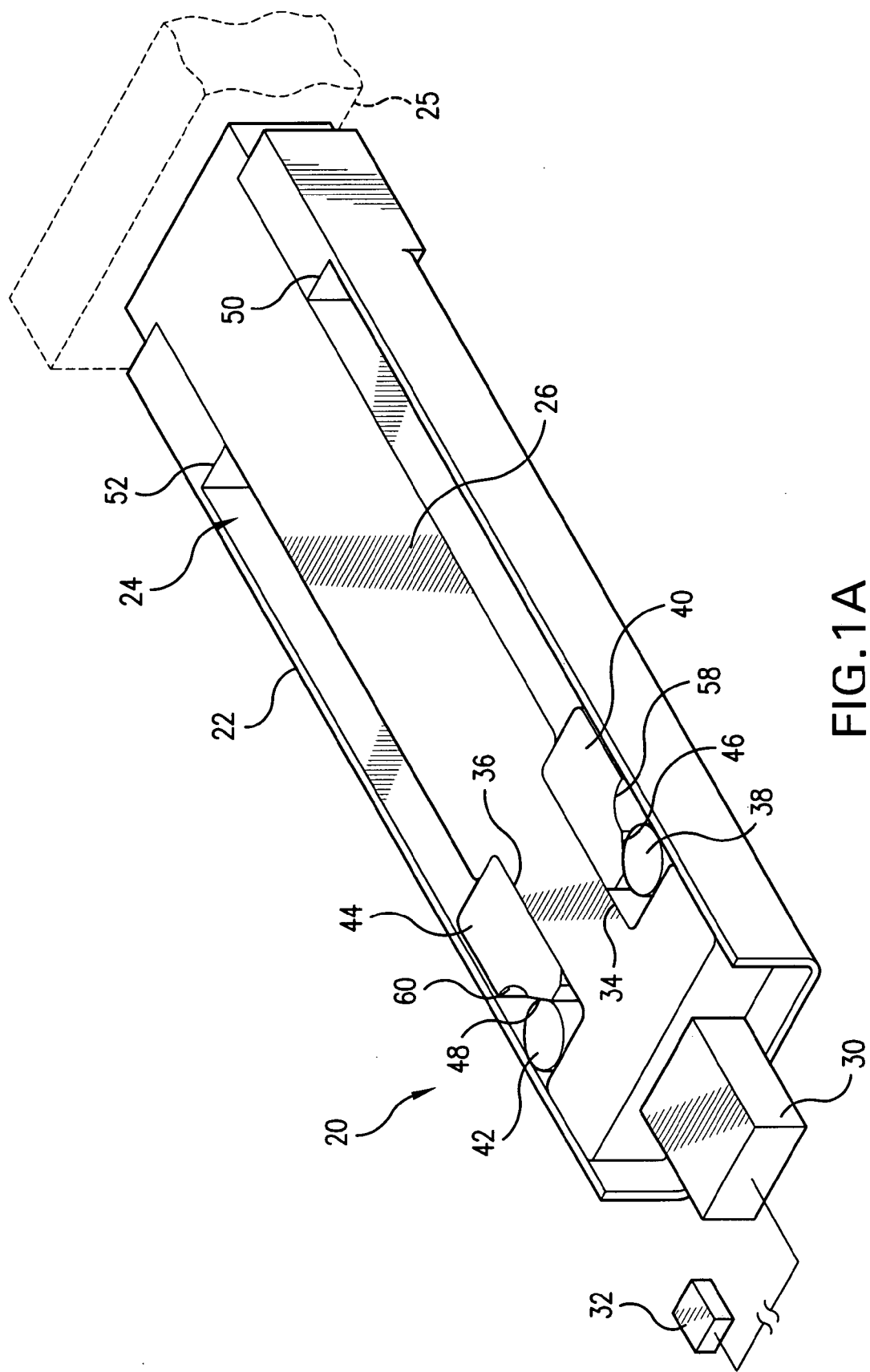
FIGS. 1A-C are partial, sectional views of a general representation of an impact energy management system for absorbing or displacing kinetic energy during a collision, according to one embodiment of this invention.
Figure 1B:
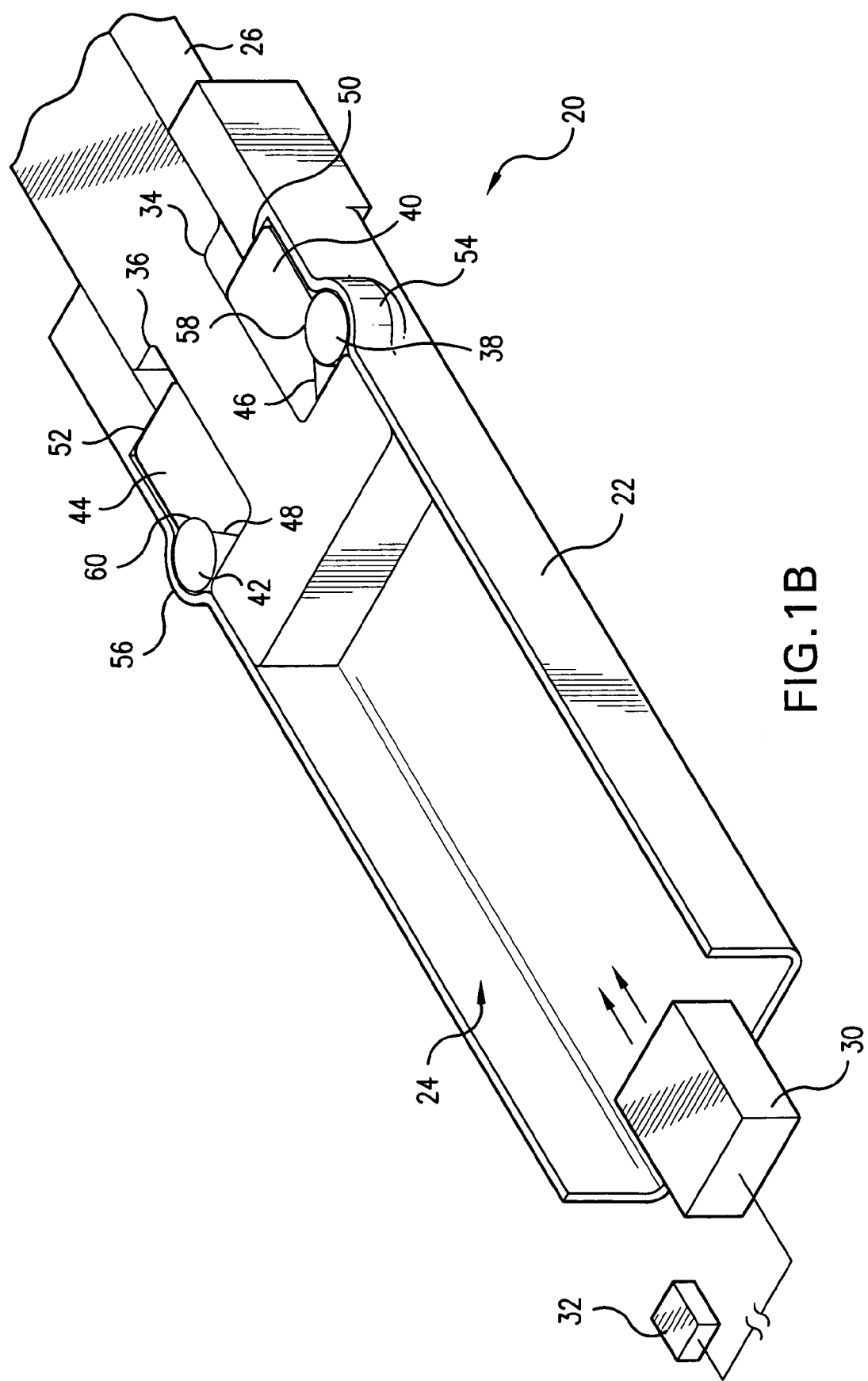
Figure 1C:
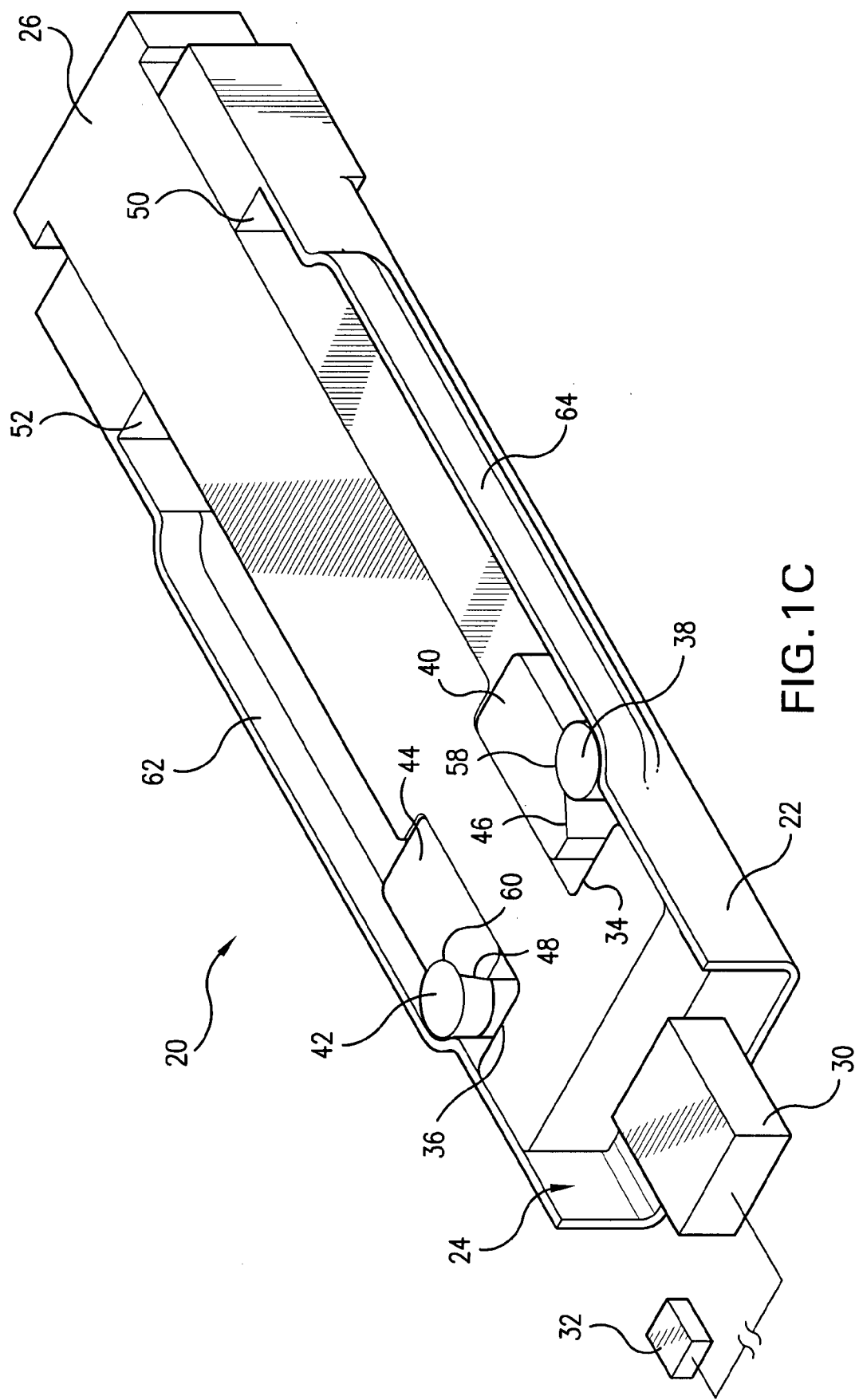

FIGS. 1A-C are partial, sectional views of a general representation of an impact energy management system 20 for absorbing or displacing kinetic energy during a collision, according to one embodiment of this invention. FIG. 1A shows the impact energy management system 20 in an inactive position before being extended to an impact position shown in FIG. 1B for absorbing or displacing kinetic energy during a collision. The impact energy management system 20 desirably extends into the impact position upon or just prior to a collision. In one embodiment of the invention, as discussed further below, the imminent collision is detected by a collision sensing device and/or sensor which activates the extension to the impact position. FIG. 1C illustrates the impact energy management system 20 upon or during a collision.

The impact energy management system 20 includes an elongated housing 22 defining a chamber 24. A contact element 26 is disposed partially within the chamber 24, and is longitudinally movable therein. The contact element 26 is also elongated and appropriately sized and shaped to move within the chamber 24. As will be appreciated by those skilled in the art following the teachings herein, alternative sizes, shapes and configurations are available for the elongated housing, chamber and contact element of this invention. In one embodiment of this invention, the housing, chamber and/or contact element is/are formed of structural high strength steel.

In one embodiment of the invention, the impact energy management system 20 includes an actuating device 30 for moving the contact element 26 from the inactive position within the chamber 24, shown in FIG. 1A, to the impact position within the chamber 24, shown in FIG. 1B, upon or prior to the collision. As will be appreciated by those skilled in the art, incorporating the actuating device of the invention is particularly beneficial in vehicle designs where the contact element, and, for example, a vehicle bumper connected thereto, where it may be undesirable to have the bumper extended in the impact position from the time of manufacturing and during general vehicle use, such as for aesthetic, safety or other design reasons. Various and alternative embodiments of the actuating device, such as those known to those skilled in the art, are available for use in the impact energy management system of the invention. FIGS. 1A-C shows a general representation of an actuating device 30. The actuating device 30 is at least partially disposed within the chamber 24 and in actuating communication with the contact element 26. Upon receiving an electrical signal, the actuating device 30 moves the contact element 26 from the inactive position to the impact position, and generally in a direction toward the imminent collision. In one preferred embodiment of the invention, the actuating device 30 includes an inflator device, such as including an initiator or squib and a supply of pressurized gas and/or gas generant material. Inflator devices useful in the actuating device 30 of this invention are generally known and available to those skilled in the art of vehicle inflatable safety restraint systems for inflating airbag cushions. The inflation gas produced by the inflator device within the chamber 24 desirably moves the contact element 26 to the impact position.

In one embodiment of this invention, the actuating device 30 is in activating combination with at least one collision sensing device 32. The collision sensing device 32 can be any device or crash sensor which detects a collision involving the vehicle including the system 20 of this invention and provides an electrical signal that is indicative thereof. A wide variety of crash sensors are known and available to those skilled in the art. For example, the collision sensing device 32 may take the form of an electronic accelerometer or incorporate radar, infrared and/or optical collision detection. Alternatively, the collision sensing device 32 may include an electromechanical device that completes an electrical circuit upon detection of sudden deceleration of the motor vehicle. For example, the collision sensing device 32 may incorporate a ball and magnet design that allows a ball to roll forward to complete an electrical circuit by touching two contacts. Alternatively, the collision sensing device 32 may take the form of a spring band and roller design that allows the roller to move forward and close a contact when tension of a spring band is overcome. Alternatively still, the collision sensing device 32 may take the form of a rotating weight design that allows a weight to move a rotor against spring tension to a point where contacts complete an electrical circuit.

The contact element 26 includes a first contact recess 34 and a second contact recess 36 on opposing sides of the contact element 26. As shown in FIG. 1A, in the inactive position, the first contact recess 34 includes a first load bearing pin 38 and a first wedge 40 disposed between the contact element 26 and the housing 22. The second contact recess 36 similarly includes a second load bearing pin 42 and a second wedge 44. Each of the wedges 40 and 44 includes an angled surface 46 and 48, respectively. The wedges 40 and 44 are disposed within the respective contact element recesses 34 and 36 with the angled surfaces 46 and 48 disposed toward and adjacent the pins 38 and 42, respectively. In one embodiment of this invention, the wedges are desirably formed of structural high strength steel. The pins are desirably formed of hardened carbon steel.

As shown in FIG. 1B, upon moving from the inactive position to the impact position, the contact element 26 moves or pushes the wedges 40 and 44 until the wedges 40 and 44 contact a respective housing end wall 50 and 52. When the wedges 40 and 44 contact the end walls 50 and 52, the moving contact element 26 continues to push the pins 38 and 40 into contact with and up the angled surfaces 46 and 48, respectively. The pins 38 and 40 are directed or extended outward into the housing 22 by the angled surfaces 46 and 48. The extended pins 38 and 40 each deform a portion 54 and 56, respectively, of the housing. As shown in FIG. 1B, the contact of the wedges 40 and 44 and the housing end walls 50 and 52 limits the longitudinal extension of the contact element 26 within the chamber 24. In one embodiment of the invention, the resistance created by the deformation of the housing 22 slows and/or stops the forward motion of the contact element alone or in combination with housing end walls 50 and 52.

During a collision, the impact force of the collision pushes the contact element 26 from the impact position back toward the original inactive position. As the contact element 26 moves within the chamber 24, the partially extended pins 38 and 42 each deform a segment of the housing. As shown in FIG. 1C, the moving contact element 26 pushes against the wedges 40 and 44. The wedges 40 and 44 desirably include pockets 58 and 60, respectively, adapted to receive and retain the generally cylindrical pins 38 and 42. The pockets 58 and 60 desirably keep the pins 38 and 42, respectively, in the extended position, and from being pushed back down the wedge angled surfaces 46 and 48 upon a collision and the reverse movement of the contact element 26. The extended pin 38 deforms a first segment 64 of the housing 22 and the pin 42 deforms a second segment 62 of the housing 22 opposite the first segment 64. Deforming the housing 22 using the extended pins 38 and 42 slows the contact element 26 by absorbing or displacing at least a portion of the kinetic energy during the collision. A portion of the force of the collision transfers to the deformed housing 22, thereby desirably reducing the peak forces on an occupant of the colliding motor vehicle during the overall impact of the collision.

The impact energy management system of the invention absorbs a portion of the kinetic energy of a collision or crash, thereby reducing the severity of the impact on a passenger of a motor vehicle. The impact energy management system is particularly useful between a front and/or rear bumper and a frame of a motor vehicle, such as an automobile. In one embodiment of the invention, the impact energy management system of the invention is utilized in pairs, one at or near either end of a vehicle bumper. Referring to FIGS. 1A-C, the contact element 26 may be one of two identical or similar bumper supports onto which the front bumper, illustrated in FIG. 1A as partial, phantom bumper 25, is attached. The housing 22 may be a portion of the vehicle frame or be attached, such as by bolts or welding, to the vehicle frame. The collision sensing device 32 may include one or more crash sensors disposed within the bumper to detect an imminent collision. However, the impact energy management system of this invention is not intended to be limited to use in bumpers, and can be used in any application where absorption of collision energy is desirable, such as, for example, in the seats and/or the hood of the vehicle.

Another advantage of the system of the invention is that by extending a bumper forward to receive an impact of a collision, a collision sensor system has additional time to analyze the collision response of the vehicle. The additional time can desirably provide vehicle safety restraint systems more flexibility in their ability to protect vehicle occupants from injury or death. For example, in a high-speed collision the extension of the bumper by the impact energy management system of the invention can provide for earlier deploying of the seat belt pre-tensioners, thereby keeping the vehicle occupant in a more desirable collision position. In addition, the frontal airbags could be desirably deployed sooner. For low-speed collisions, the seat belt pre-tensioners can also be deployed sooner. Furthermore, the system of the invention can provide a collision analyzing system with additional time to determine if any airbag deployment is even necessary, given the determined properties of the particular low-speed collision. As will be appreciated, various scenarios can be recognized where the additional time provided by the system of the invention allows for improved occupant protection and less cost in repair work and/or safety restraint system replacement.

The system of the invention can also reduce vehicle damage and costly repairs, particularly vehicle body work from low-speed collisions. Often, even in low-speed collisions, damage occurs to grills, hoods and fenders, besides the bumper. By extending the bumper, the impact energy management system of the invention can reduce the potential for damage to other vehicle parts.

The impact energy management system of the invention is relatively simple and inexpensive to produce and install. The housing can be manufactured in a relatively simple high-speed process such as, for example, a hydro-forming process, to form the recesses discussed above. The system can be manufactured as a bolt in place, easily replaceable system extending from the vehicle frame and connecting to the bumper. The system of the invention is easily concealed and can be used with various bumper installations.

As will be appreciated by those skilled in the art following the teachings herein provided, alternative configurations and materials of manufacture are available for the impact energy management system of the invention. The following discussion refers to additional exemplary embodiments, without limitation, of the impact energy management system of this invention.

Figure 2A:
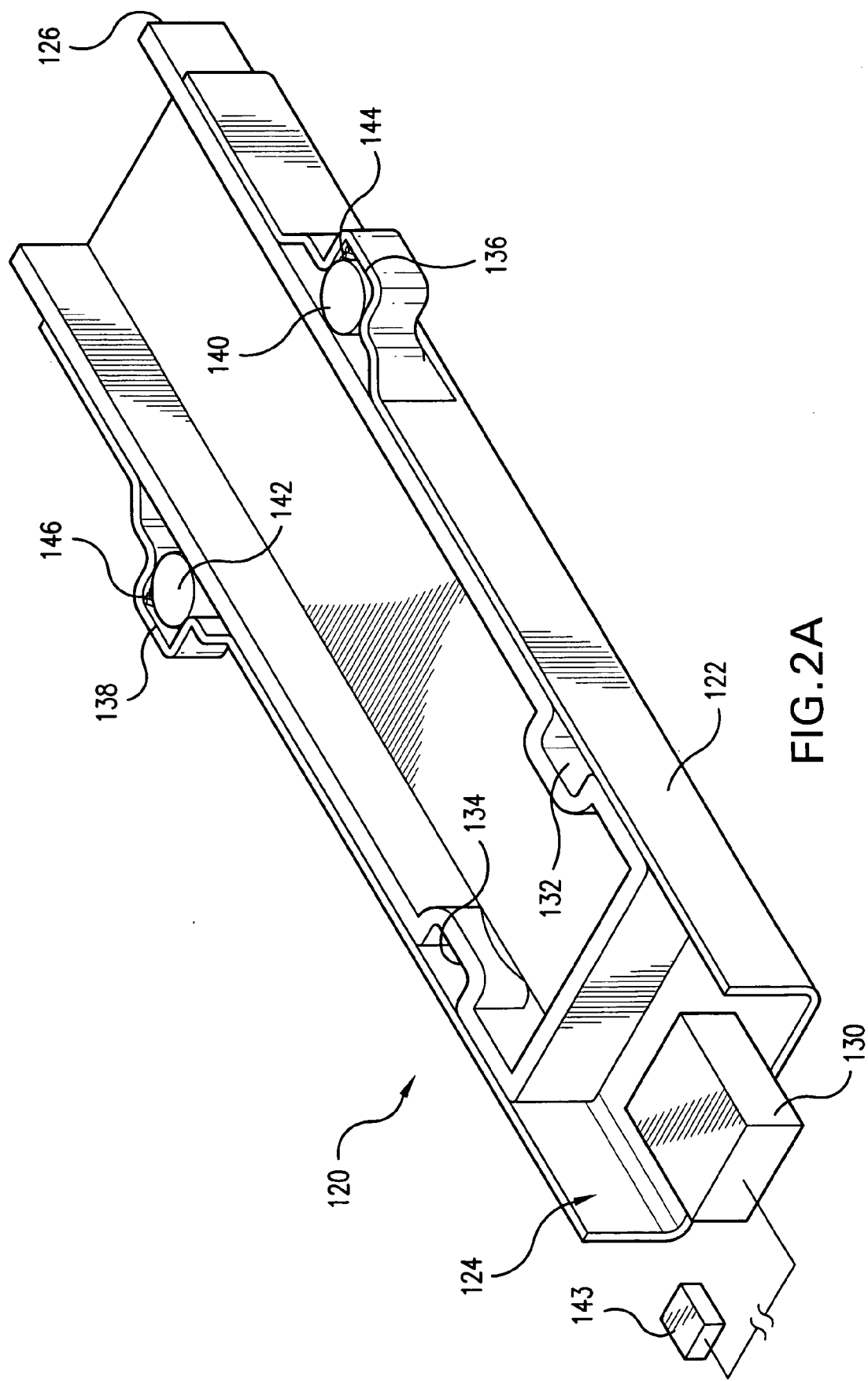
FIGS. 2A-C are partial, sectional views of a general representation of an impact energy management system for absorbing or displacing kinetic energy during a collision, according to another embodiment of this invention.
Figure 2B:
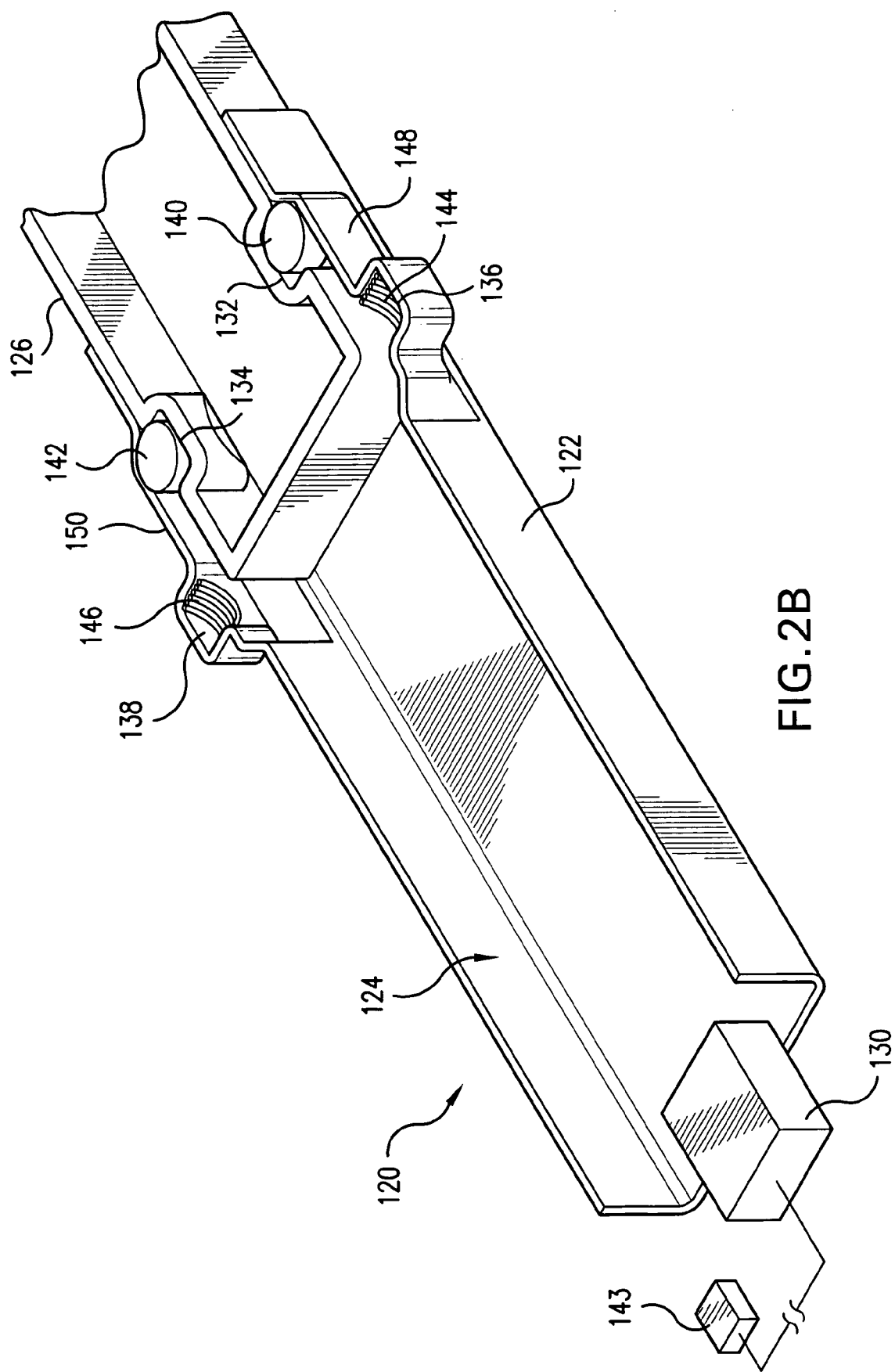
Figure 2C:
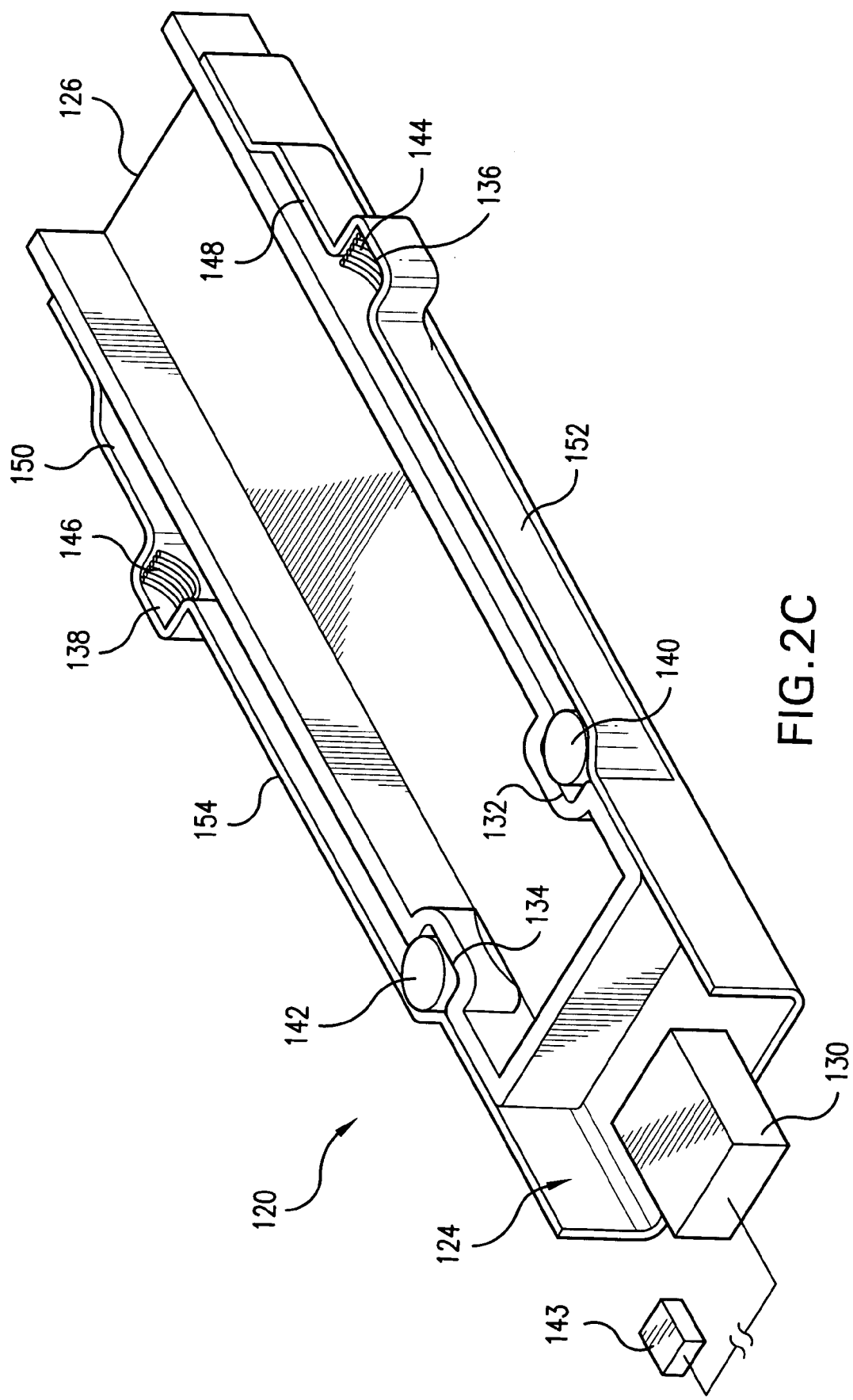

FIGS. 2A-C are partial, sectional views of a general representation of an impact energy management system 120 for absorbing or displacing kinetic energy during a collision, according to one embodiment of the invention. FIG. 2A shows the impact energy management system 120 in the inactive position before being extended to the impact position shown in FIG. 2B for absorbing or displacing kinetic energy during a collision. FIG. 2C illustrates the impact energy management system 120 upon or during a collision.

The impact energy management system 120 includes an elongated housing 122 defining a chamber 124. A contact element 126 is disposed at least partially within the chamber 124 and is longitudinally movable therein. In the embodiment of the invention shown in FIGS. 2A-C, the contact element 126 is generally hollow. An actuating device 130, such as described above, is at least partially disposed within the chamber 124 and in actuating communication with the contact element 126. A first contact element recess 132 and a second contact element recess 134 are disposed in opposing sides of the contact element 126, and more particularly in an outer wall of the hollow contact element 126.

The housing 122 includes a first housing recess 136 and a second housing recess 138 on an opposing side of the housing 122. A first load bearing pin 140 is disposed within the first housing recess 136, and generally between the housing 122 and the contact element 126. A second load bearing pin 142 is similarly disposed within the second housing recess 138. Each of the housing recesses 136 and 138 include a pin engagement element disposed adjacent the pins 140 and 142, respectively. In the embodiment shown in FIGS. 2A-C, a first pin engagement element includes a first spring 144 compressed between the first pin 140 and the first housing recess 136. A second pin engagement element includes a second spring 146 compressed between the second pin 142 and the second housing recess 138.

FIG. 2B illustrates the impact energy management system 120 wherein the contact element 126 is in the impact position. Upon the detection of an imminent collision by a collision sensing device 143, the actuating device 130 moves the contact element 126 longitudinally within the chamber 124 to the impact position. When the contact element recesses 132 and 134 move into alignment with the housing recesses 136 and 138, respectively, the springs 144 and 146 extend the pins 140 and 142 into the housing recesses 136 and 138, respectively. The pins 140 and 142 partially extend from the housing recesses 136 and 138 which, as shown in FIG. 2B, allows the pins 140 and 142 to deform a portion 148 and 150 of the housing 122, respectively. The deformation of portions 148 and 150 enlarge the housing recesses 136 and 138, such that in the impact position the pins 140 and 142 are still considered to be within the housing recesses 136 and 138. The resistance provided by the deformation of portions 148 and 150 desirably slows and/or stops the forward motion of the contact element 126. Slowing and/or stopping the extension of the contact element 126 using the pins 140 and 142 to deform housing portions 148 and 150 desirably reduces or eliminates the need for a relatively heavy, complex, and/or costly stopping mechanism.

During a collision, as shown in FIG. 2C, the impact force of the collision pushes the contact element 126 from the impact position back toward the original inactive position shown in FIG. 2A. As the contact element 126 moves within the chamber 124, the partially extended pins 140 and 142 each contact and deform a segment of the housing 122. The pin 140 deforms a first segment 152 of the housing 122, and the pin 142 deforms a second segment 154 of the housing 122 on an opposite housing side from the first segment 152. The released springs 144 and 146 desirably block the pins 140 and 142 from slipping back into the housing recesses 136 and 138.

Figure 3A:
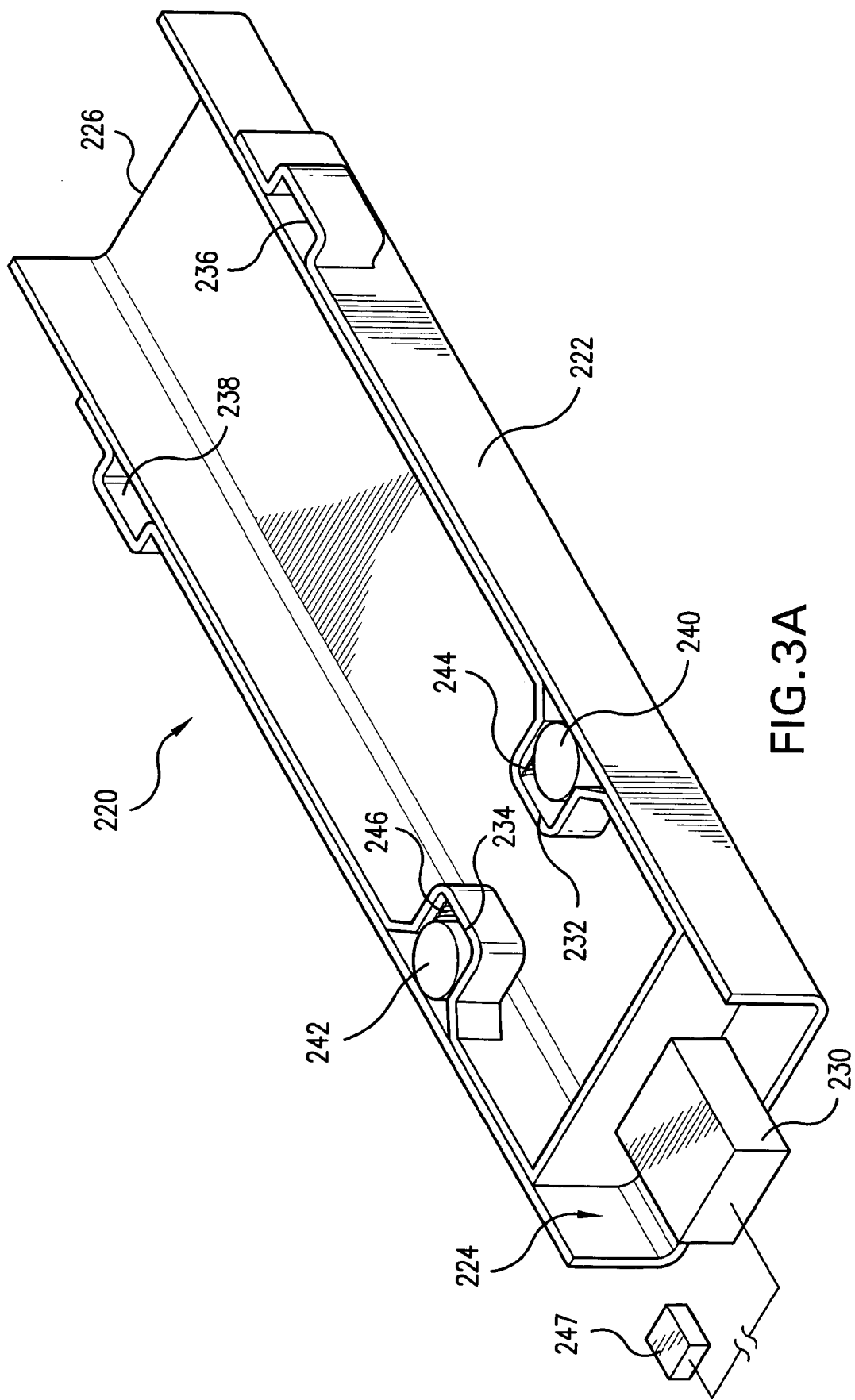
FIGS. 3A-C are partial, sectional views of a general representation of an impact energy management system for absorbing or displacing kinetic energy during a collision, according to yet another embodiment of this invention.
Figure 3B:
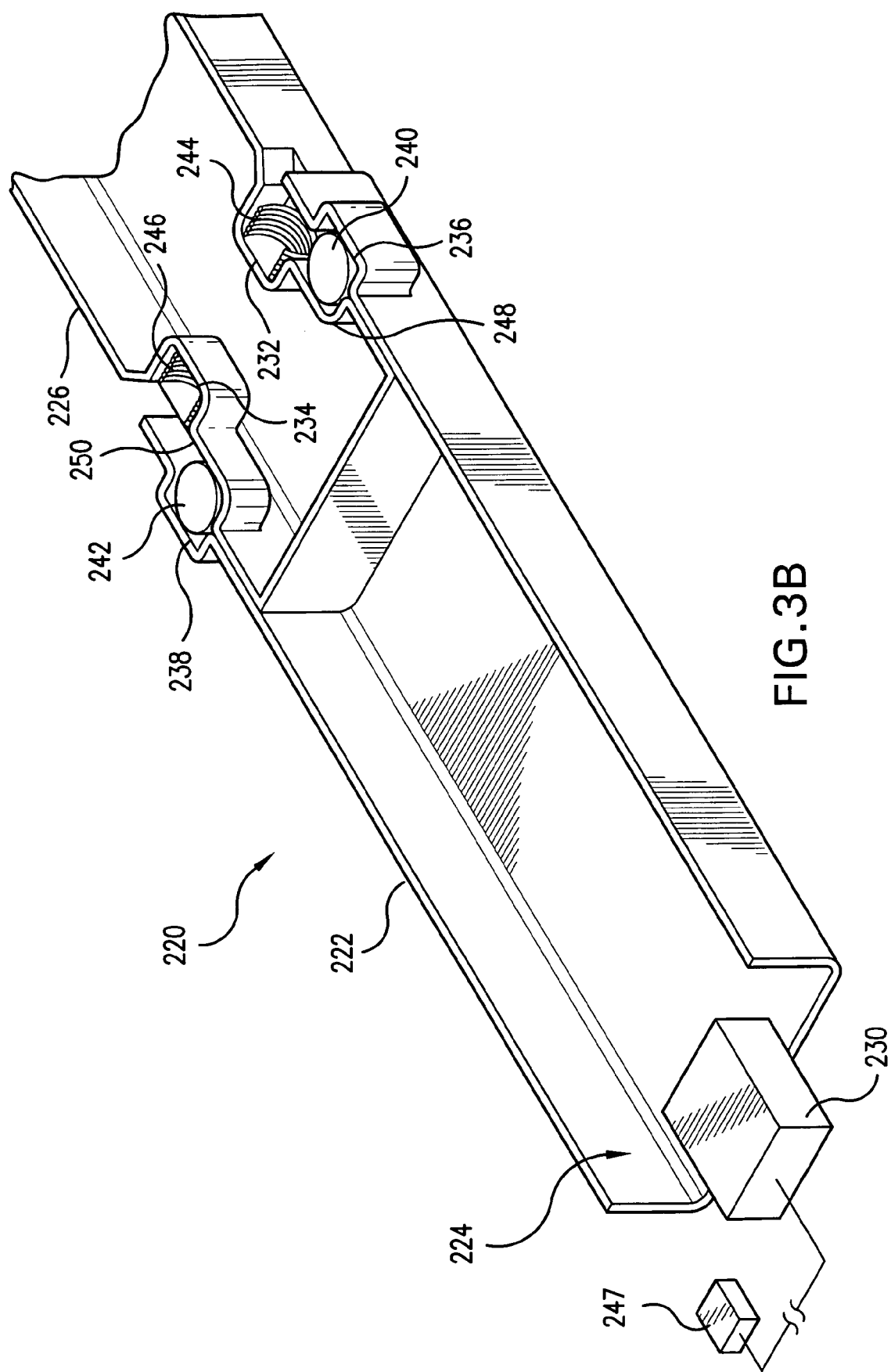
Figure 3C:
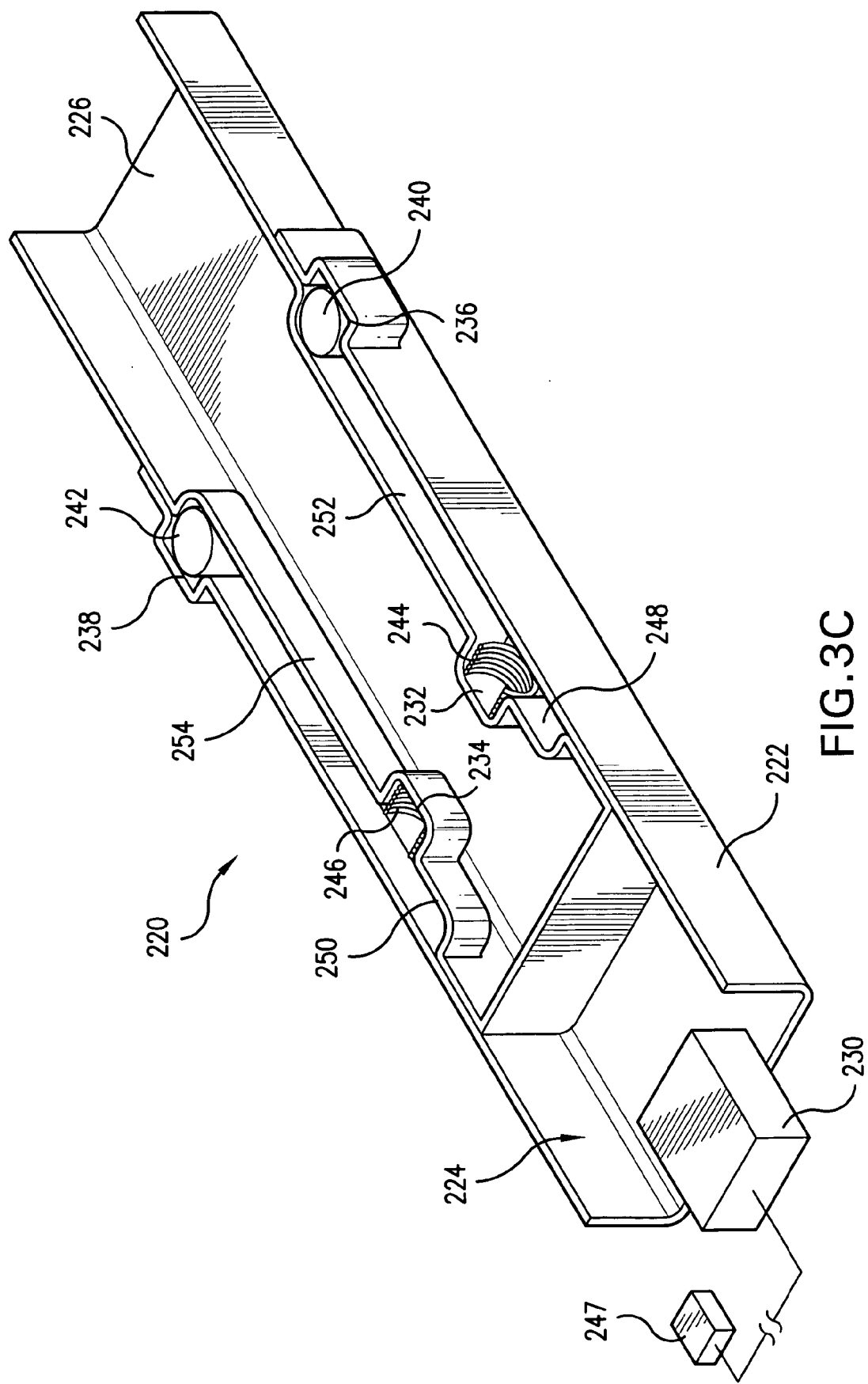

FIGS. 3A-C are partial, sectional views of a general representation of an impact energy management system 220 according to another embodiment of this invention. FIG. 3A shows the impact energy management system 220 in the inactive position before being extended to the impact position shown in FIG. 3B for absorbing or displacing kinetic energy during a collision. FIG. 3C illustrates the impact energy management system 220 upon or during a collision.

The impact energy management system 220 includes an elongated housing 222 defining a chamber 224. An actuating device 230, such as described above, is at least partially disposed within the chamber 224 and in actuating communication with the contact element 226 to longitudinally move the contact element 226 to an impact position shown in FIG. 3B. A first contact element recess 232 and a second contact element recess 234 are disposed in opposing sides of the contact element 226, and more particularly an outer wall of the hollow contact element 226. The housing 222 includes a first housing recess 236 and a second housing recess 238 in an opposing side of the housing.

A first load bearing pin 240 is disposed within the first contact element recess 232 and generally between the housing 222 and the contact element 226. A second load bearing pin 242 is similarly disposed within the second contact element recess 234. The first contact element recess 232 includes as a first pin engagement element a first spring 244 compressed between the first pin 240 and the first contact element recess 232. A second spring 246 is similarly compressed between the second pin 242 and the second contact element recess 234.

FIG. 3B illustrates the impact energy management system 220 wherein the contact element 226 is in the impact posititon. Upon the detection of an imminent collision by a collision sensing device 247, the actuating contact element 226 longitudinally moves within the chamber 224 to the impact position. When the contact element recesses 232 and 234 move into alignment with the housing recesses 236 and 238, respectively, the springs 244 and 246 partially extend the pins 240 and 242 into the housing recesses 236 and 238, respectively. The pins 240 and 242 partially extend from the housing recesses 236 and 238 and, as shown in FIG. 3B, each of the pins 240 and 242 deforms a portion 248 and 250 of the contact element 226, respectively, as the contact element 226 moves within the chamber 224. As discussed above, such deformation extends the contact element recesses 232 and 234 and desirably stops or assists in stopping the forward extension of the contact element 226.

During a collision, the force of the collision moves or drives the contact element 226 from the impact position back toward the original inactive position shown in FIG. 3A. As the contact element 226 moves within the chamber 224, the portion of the pins 240 and 242 extending from the housing recesses 236 and 238 each deform a segment of the contact element 226. As shown in FIG. 3C, the pin 240 deforms a first segment 252 of the contact element 226 and the pin 242 deforms a second segment 254 of the contact element 226 on an opposite side from the first segment 252.

Figure 4A:
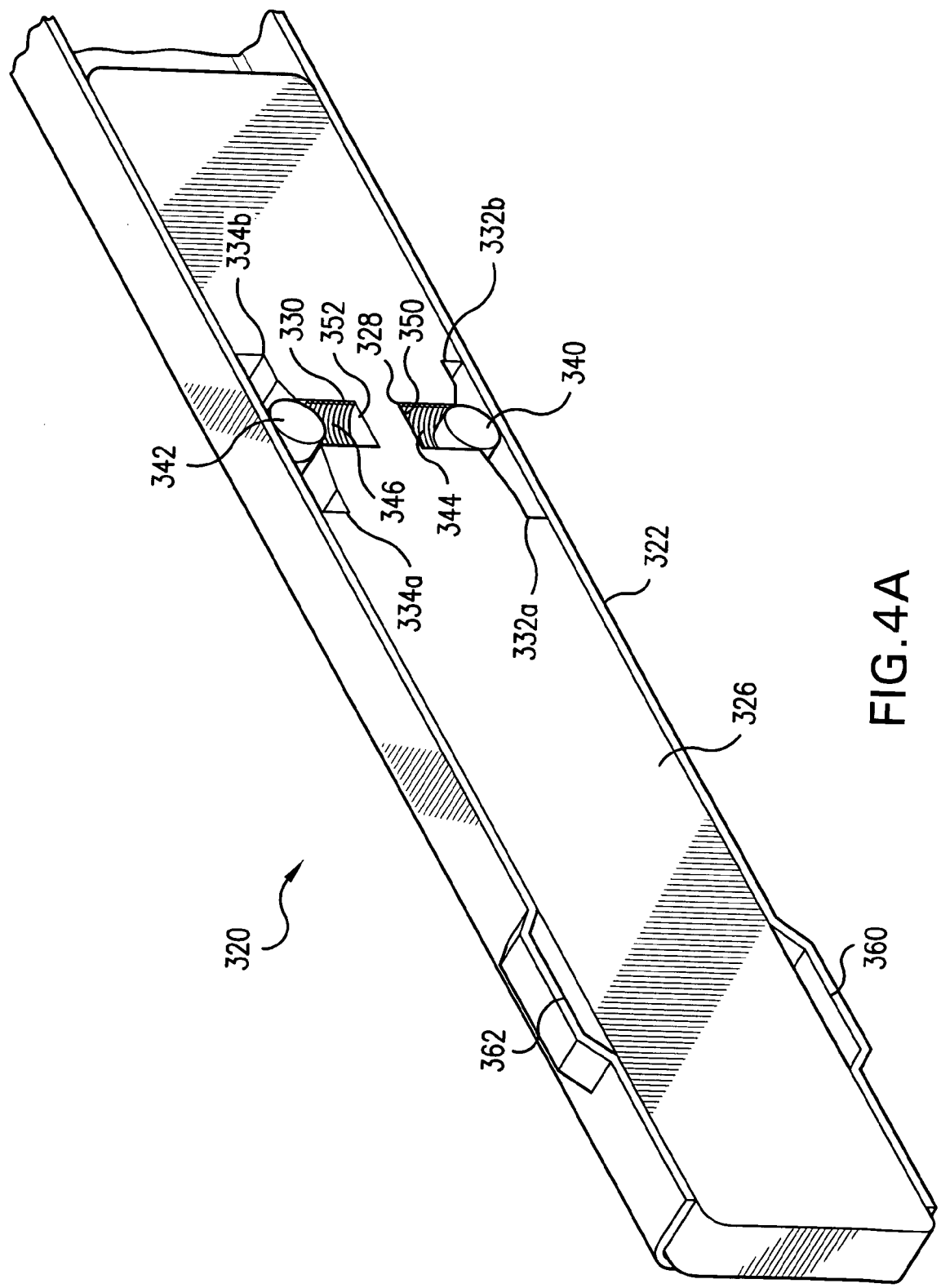
Figure 4B:
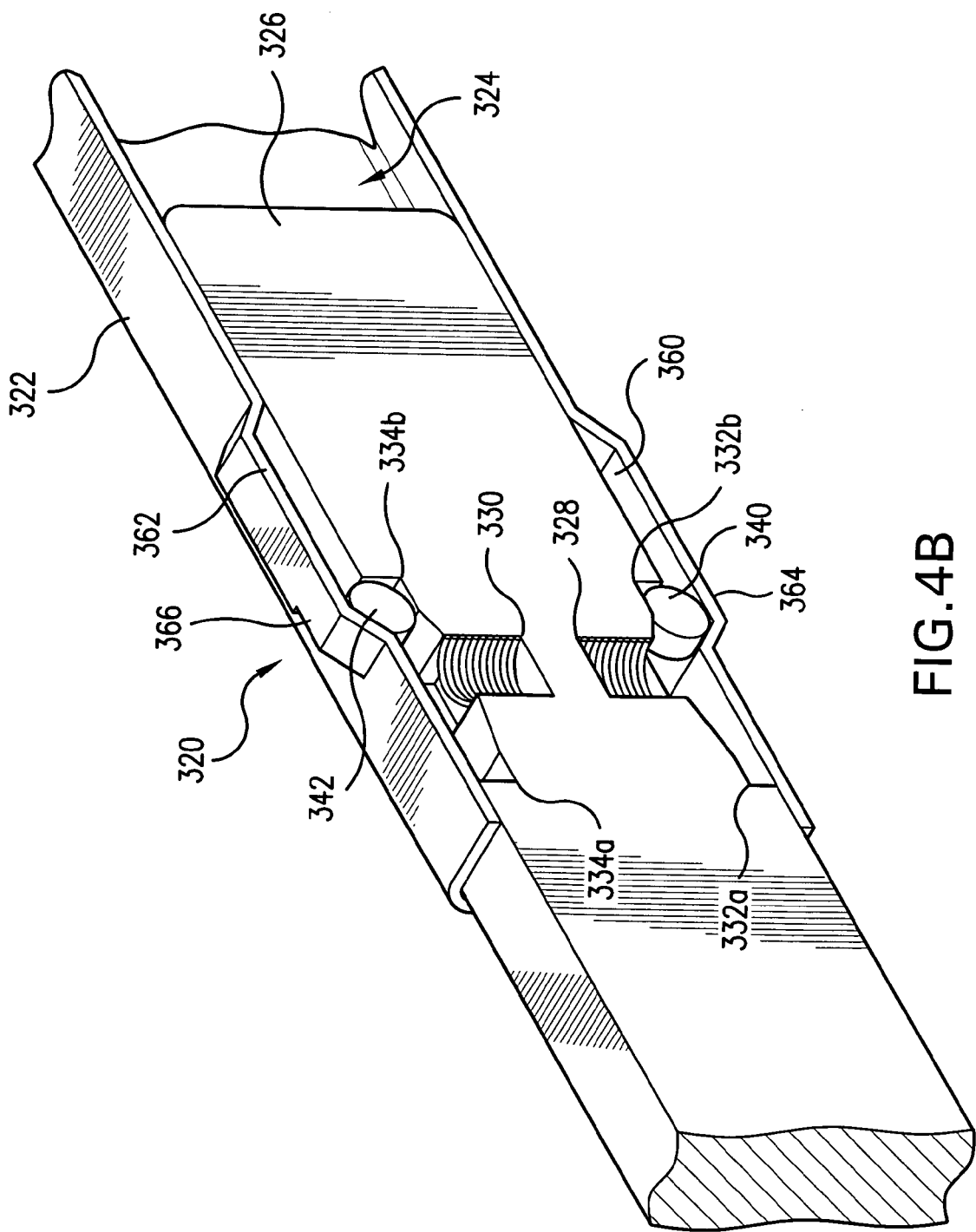

FIGS. 4A-C are partial, sectional views of a general representation of an impact energy management system 320 according to still yet another embodiment of this invention. FIG. 4A shows the impact energy management system 320 in an inactive position before being extended, by an actuating device (not shown) in activating combination with at least one collision sensing device (not shown), to an impact position shown in FIG. 4B for absorbing or displacing kinetic energy during a collision. FIG. 4C illustrates the impact energy management system 320 upon or during a collision.

The impact energy management system 320 includes an elongated housing 322 defining a chamber 324. A contact element 326 is disposed at least partially within the chamber 324 and is longitudinally movable therein. In one embodiment of this invention, the contact element 326 moves from the inactive position within the chamber 324 to the impact position within the chamber 324 upon or prior to the collision as a result of an activated actuating device (not shown), such as, for example, the actuating device discussed above.

The contact element 326 includes a first contact element recess 328 and a second contact element recess 330. The first and second contact element recesses 328 and 330 are disposed aligned in opposing sides of the contact element 326. In the embodiment shown in FIGS. 4A-C, each of the first and second contact element recesses 328 and 330 include a pair of recess shoulders that provide generally T-shaped contact element recesses 328 and 330. The first contact element 328 includes first and second recess shoulders 332a and 332b. The second contact element 330 includes first and second recess shoulders 334a and 334b.

In the inactive position shown in FIG. 4A, a generally cylindrical first load bearing pin 340 is disposed in the first contact element recess 328. A first pin engagement element, or spring 344, is disposed within the first contact recess 328 and adjacent the first pin 340. The spring 344 is compressed between the first pin 340 and a bottom wall 350 of the first contact element recess 328, and exhibits an outward force on the first pin 340. A generally cylindrical second load bearing pin 342 is disposed in the second contact element recess 330. A second pin engagement element, or spring 346, is disposed within the second contact recess 330 and adjacent the second pin 342. The spring 346 is compressed between the second pin 342 and a bottom wall 352 of the second contact element recess 330, and exhibits an outward force on the second pin 342.

The housing 322 includes a first housing recess 360 and a second housing recess 362. The first and second housing recesses 360 and 362 are disposed aligned in opposing sides of the housing 322. In the embodiment of the invention shown in FIG. 4A, the first and second housing recesses 360 and 362 are generally elongated, having a length longer than a width or diameter of the pins 360 and 362, respectively.

FIG. 4B shows the impact energy management system 320 and the contact element 336 in the impact position. The first pin 340 is partially disposed in each of the first contact element recess 328 and the first housing recess 360. The second pin 342 is partially disposed in each of the second contact element recess 330 and the second housing recess 362. While the contact element 326 moves from the inactive position to the impact position, the first contact element recess 328 and the first housing recess 360 align. The aligning of the first contact element recess 328 and the first housing recess 360 allows the first spring 344 to extend the first pin 340 into the first housing recess 360. The continued movement of the contact element 326 moves the first pin 340 into the recess shoulder portion 332b and pushes the first pin 340 against the end of the housing recess 360. The first pin 340 deforms a portion 364 of the housing 322 and enlarges the first housing recess 360. In a similar manner, the second contact element recess 330 and the second housing recess 362 align while the contact element 326 moves to the impact position. The second spring 346 extends the second pin 342 into the second housing recess 362. The continued movement of the contact element 326 moves the second pin 342 into the recess shoulder portion 334b and pushes the second pin 342 against the end of the second housing recess 362. The second pin 342 deforms a portion 366 of the housing 322 and enlarges the second housing recess 362. The first and second pins 340 and 342 contacting and deforming the portions 364 and 366, respectively, of the housing 322 desirably slows and/or stops the extension of the contact element 326.

During a collision the contact element 326 moves from the impact position shown in FIG. 4B back toward the inactive position shown in FIG. 4A. As the contact element 326 moves within the chamber 324, the pins 340 and 242 move to shoulders 332a and 334a, respectively. The portions of the pins 340 and 342 extending into the housing recesses 360 and 362 each deform a segment of the housing 322. As shown in FIG. 4C, the first pin 340 deforms a first segment 370 of the housing 322 and the second pin 342 deforms a second segment 372 of the housing 322 on an opposite contact element side from the first segment 370.

The impact energy management system of the invention beneficially transfers kinetic impact energy from one of a contact element and a housing to the other of the contact element and the housing. While particular preferred embodiments of this invention have been discussed above with reference to the figures, still other alternative embodiments of this invention are also contemplated.

In one embodiment of this invention, the impact energy management system is positioned in the impact position at the manufacture or installation of the system. In this embodiment, the system does not require an actuating device and/or a pin engagement element to extend the contact element and/or the pin, as the contact element is already in the impact position and the pin already in the desired position. The pin is desirably disposed partially within a housing recess and partially within a contact element recess. In another embodiment of the invention, the system is incorporated or attached to the vehicle in the inactive position and the contact element is manually or mechanically pulled into the impact position by an external force during vehicle manufacture. In these embodiments of the invention, the system is in the impact position at all times during vehicle operation.

Figure 5A:
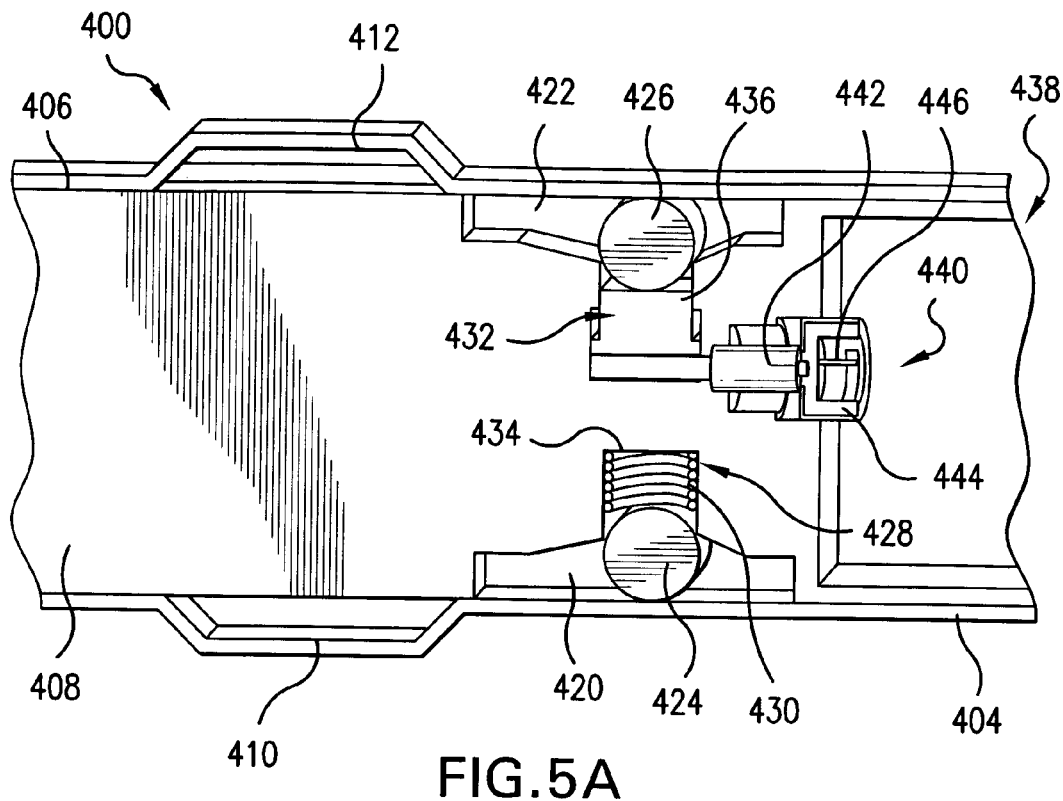
FIGS. 5A-B are partial sectional views generally illustrating an alternative pin engagement element configuration according to one embodiment of the invention.
Figure 5B:
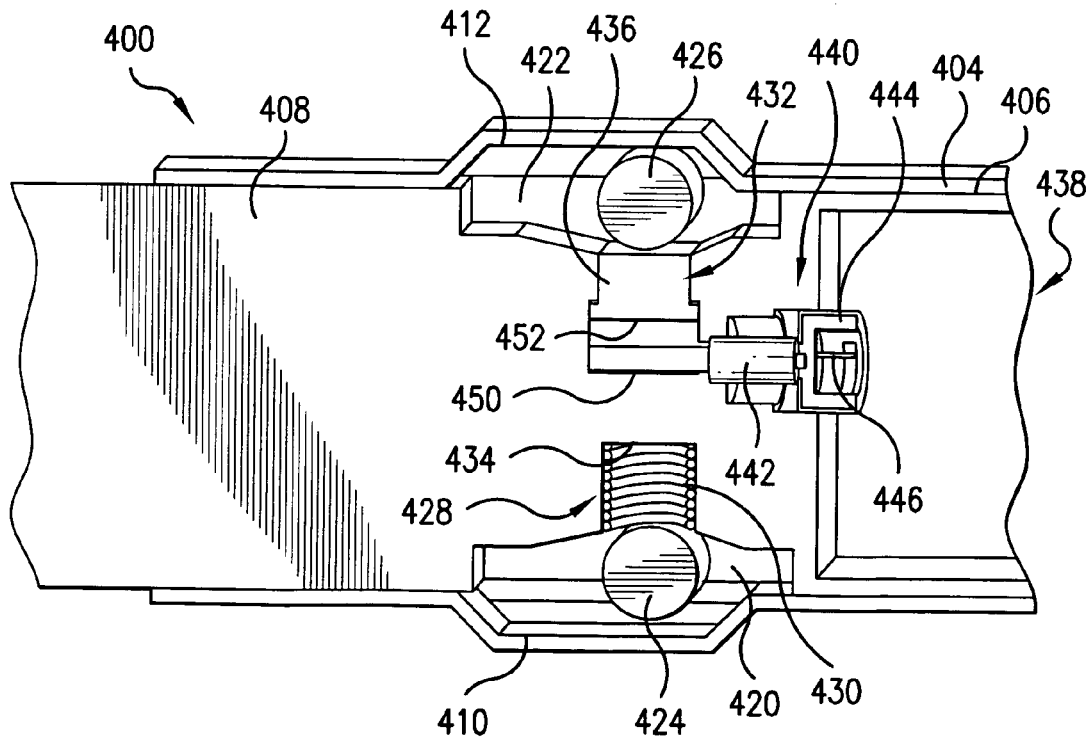

FIGS. 5A-B are partial sectional views generally illustrating an impact energy management system 400 according to the invention including or incorporating an alternative embodiment of a pin engagement element. The overall configuration and function of the impact energy management system 400 shown in FIGS. 5A-B is generally similar to the impact energy management system 300 shown in FIGS. 4A-C, however, the described alternative pin engagement element is not intended to be limited in application to any one of the above described embodiments.

The impact energy management system 400 includes an elongated housing 404 defining a chamber 406. A contact clement 408 is disposed at least partially within the chamber 406 and is longitudinally movable therein. The housing 404 includes a first housing recess 410 and a second housing recess 412 on an opposing side of the housing 404 from the first housing recess 410.

The contact element 408 includes a first contact element recess 420 and a second contact element recess 422. Each of the first and second contact element recesses 420 and 422 are generally T-shaped and include therein a load bearing pin 424 and 426, respectively. The first contact element recess 420 includes a first pin engagement element 428 adjacent to the pin 424. The second contact element recess 422 includes a second pin engagement element 432. The first pin engagement element 428 includes a spring 430, such as discussed above, compressed between the first pin 424 and a bottom wall 434 of the first contact element recess 420.

The second pin engagement element 432 includes a plug 436 within the second contact element recess 422 and disposed adjacent the second pin 426. An engagement element initiating device 440 is disposed in initiating combination with the plug 436. The contact clement 408 includes a hollow portion 438 for receiving and connecting the engagement element initiating device 440. The engagement element initiating device 440 includes an initiator or squib 442 attached to an injection molded mating interface 444. The mating interface 444 is adapted to accept and connect an electrical connector (not shown) to one or more conductive pins 446 of the squib 442. The engagement element initiating device 440 is connected through the electrical connector and mating interface 444 to at least one collision sensing device, such as described above, for measuring at least one collision property of an imminent collision.

The engagement element initiating device 440 allows for adaptive deployment of the second pin 426. In one embodiment of the invention, the engagement element initiating device 440 initiates the second pin engagement element 432 only upon the collision sensing device measuring a predetermined collision property. For example, in one embodiment of this invention, the detection by the collision sensing device of an imminent low-speed collision below a predetermined threshold, does not initiate the engagement element initiating device 440 and thus the second pin 426 is not extended. Only the first pin 424 is extended and deforms a segment of the housing 404 upon the collision. If the collision sensing device detects an imminent high-speed collision, the engagement element initiating device 440 initiates the second pin engagement element 432 to extend the second pin 426, and both pins 424 and 426 are extended and deform segments of the housing 404 upon the collision. Therefore, the engagement element initiating device 440 allows for adaptive or intelligent deployment of either only the first pin 424, or both pins 424 and 426, depending on one more detected properties or characteristics of the imminent collision, such as for example, the velocity, angle and/or severity of the impact.

FIG. 5B shows the second pin 426 extended into the housing recess 412 by the plug 436 of the second pin engagement element 432. To extend the second pin 426 upon the contact element moving into the impact position, the squib 442 receives an electrical signal from the collision sensing device. The electrical signal initiates the reaction of a supply of reactive materials within the squib 442. The reaction products produced by the reacting reactive materials rupture the squib 442, enter a channel 450 and contact a bottom wall 452 of the plug 436. The reaction products move the plug 436 outward within the second contact element recess 422 and the moving plug 436, in turn, extends the second pin 426 into the second housing recess 412. As will be appreciated by those skilled in the art, the impact energy management system of the invention can also include two pin engagement elements embodied identical or similar in type to the second engagement element 432.

Thus, the invention provides an impact energy management system which can be incorporated anywhere in a motor vehicle where absorption of collision energy is needed or desired, such as, for example, in bumpers, seats and/or the hood of the vehicle. The system of the invention provides additional time during a collision for a collision sensor system to analyze the collision and make the appropriate response. The additional time can desirably provide vehicle safety restraint systems more flexibility in their ability to protect vehicle occupants from injury or death. The system of the invention can also reduce vehicle damage and costly repairs, particularly vehicle body work typically caused by low-speed collisions. The impact energy management system of the invention is relatively simple and inexpensive to produce and install, and easily concealed in various applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An impact energy management system for absorbing or displacing kinetic energy during a collision, the system comprising:
    a housing defining a chamber;
    a contact element disposed at least partially within the chamber and longitudinally movable therein; and
    at least a first load bearing pin disposed between the contact element and the housing;
    wherein prior to the collision the contact element is disposed in an impact position and upon the collision the contact element moves within the chamber and the first pin deforms a segment of at least one of the housing and the contact element.

2. The impact energy management system according to claim 1 wherein the housing comprises a vehicle frame and the contact element comprises a bumper support for securing a bumper to the vehicle frame.

3. The impact energy management system according to claim 1 additionally comprising an actuating device for moving the contact element from an inactive position within the chamber to the impact position within the chamber upon or prior to the collision.

4. The impact energy management system according to claim 3 additionally comprising a collision sensing device for sensing an imminent collision and in activating combination with the actuating device, wherein the actuating device moves the contact element from the inactive position to the impact position upon the sensing of the imminent collision.

5. The impact energy management system according to claim 3 wherein the actuating device comprises an inflator device.

6. The impact energy management system according to claim 3 wherein the first pin extends outward from the contact element and deforms a portion of the housing as the contact element moves into the impact position.

7. The impact energy management system according to claim 6 additionally comprising a wedge in combination with the first pin and the contact element, wherein the wedge directs the pin outward when the contact element moves into the impact position.

8. The impact energy management system according to claim 1 wherein the housing comprises a housing recess, wherein the first pin is partially disposed in the housing recess when the contact element is in the impact position.

9. The impact energy management system according to claim 1 additionally comprising a second load bearing pin disposed between the contact element and the housing.

10. An impact energy management system for absorbing or displacing kinetic energy during a collision, the system comprising:
    an elongated housing defining a chamber;
    a contact element disposed at least partially within the chamber and longitudinally movable therein;
    at least one of the housing and the contact element including a recess;
    an actuating device for moving the contact element from an inactive position within the chamber to an impact position within the chamber upon or prior to the collision; and
    a load bearing pin disposed within the recess of one of the housing and the contact element in the inactive position and the pin partially disposed in the recess in the impact position;
    wherein during the collision the contact element moves from the impact position toward the inactive position, whereby the pin deforms a segment of at least one of the housing and the contact element.

11. The impact energy management system according to claim 10 wherein the recess comprises a contact element recess disposed in the contact element, and the energy management system additionally comprising a wedge including an angled surface, the wedge disposed within the contact element recess with the angled surface adjacent the pin, wherein, upon the contact element moving into the impact position, the pin contacts the angled surface of the wedge and is partially extended outward to deform a portion of the housing.

12. The impact energy management system according to claim 11 additionally comprising a housing end wall, wherein, upon the contact element moving into the impact position, the wedge contacts the housing end wall and the pin contacts the angled surface of the wedge to partially extend the pin into the housing.

13. The impact energy management system according to claim 10 additionally comprising:
   a contact element recess m the contact element; and
   a housing recess in the housing;
   wherein in the inactive position the pin is disposed in one of the contact element recess and the housing recess, and in the impact position the pin is partially disposed in each of the contact element recess and the housing recess.

14. The impact energy management system according to claim 13 additionally comprising a pin engagement element disposed adjacent the pin and within the one of the contact element recess and the housing recess, wherein in the impact position the pin engagement element partially extends the pin from the one of the contact element recess and the housing recess into the other of the contact element recess and the housing recess.

15. The impact energy management system according to claim 14 wherein the pin engagement element comprises a spring disposed between the pin and a bottom wall of the one of the contact element recess and the housing recess.

16. The impact energy management system according to claim 10 additionally comprising:
   at least one of the housing and the contact element including a first recess and a second recess, the first and second recesses disposed on opposing sides of the at least one of the housing and the contact element; and
   a first load bearing pin disposed at least partially in the first recess and a second load bearing pin disposed at least partially in the second recess when in the impact position;
   wherein during the collision the contact element moves from the impact position toward the inactive position and at least one of the first and second pins deforms a segment of at least one of the housing and the contact element.

17. An impact energy management system for absorbing or displacing kinetic energy during a collision, the system comprising:
   an elongated housing defining a chamber;
   a contact element disposed at least partially within the chamber and longitudinally movable therein;
   an actuating device for moving the contact element from an inactive position within the chamber to an impact position within the chamber upon or prior to the collision;
   a first contact element recess in the contact element;
   a second contact element recess in the contact element on an opposite side of the first contact element recess;
   a first housing recess in the housing;
   a second housing recess in the housing on an opposite side of the first housing recess;
   a first load bearing pin disposed in the inactive position in one of the first contact element recess and the first housing recess; and
   a second load bearing pin disposed in the inactive position in one of the second contact element recess and the second housing recess;
   wherein in the impact position at least the first pin is partially disposed in each of the first contact element recess and the first housing recess and during the collision the contact element moves from the impact position toward the inactive position, whereby at least the first pin deforms a segment of at least one of the housing and the contact element.

18. The impact energy management system according to claim 17 additionally comprising:
   a first pin engagement element disposed adjacent the first pin and within the one of the first contact element recess and the first housing recess, wherein the first pin engagement element is adapted to extend the first pin from the one of the first contact element recess and the first housing recess partially into the other of the first contact element recess and the first housing recess when in the impact position; and
   a second pin engagement element disposed adjacent the second pin and within the one of the second contact element recess and the second housing recess, wherein the second pin engagement element is adapted to extend the second pin from the one of the second contact element recess and the second housing recess partially into the other of the second contact element recess and the second housing recess when in the impact position.

19. The impact energy management system according to claim 18 additionally comprising an engagement element initiating device in initiating combination with at least the second pin engagement element, the engagement element initiating device including a collision sensor for measuring at least one collision property, wherein, upon the contact element moving into the impact position, the engagement element initiating device one of initiates or does not initiate the second pin engagement element as a function of the at least one collision property.

20. The impact energy management system according to claim 17 wherein the housing comprises a vehicle frame and the contact element comprises a bumper support for securing a bumper to the vehicle frame.

* * * * *